(12) United States Patent (10) Patent No.: US 8,908,535 B2
Campbell et al. (45) Date of Patent: Dec. 9, 2014

(54) METHODS, TRAFFIC SIMULATORS, AND COMPUTER READABLE MEDIA FOR VALIDATING LONG TERM EVOLUTION (LTE) CODE BLOCKS AND TRANSPORT BLOCKS

(75) Inventors: Damon Lee Campbell, San Carlos, CA (US); Eric Hugh Wilke, Raleigh, NC (US)

(73) Assignee: Ixia, Calabasas, CA (US)

( * ) Notice: Subject to any disclaimer, the term of this patent is extended or adjusted under 35 U.S.C. 154(b) by 451 days.

(21) Appl. No.: 13/371,389

(22) Filed: Feb. 10, 2012

(65) Prior Publication Data

US 2013/0208600 A1 Aug. 15, 2013

(51) Int. Cl.
*G01R 31/08* (2006.01)

(52) U.S. Cl.
USPC ........................................... 370/242; 370/476

(58) Field of Classification Search
USPC .......... 370/242, 243, 244, 245, 473, 474, 476
See application file for complete search history.

(56) References Cited

U.S. PATENT DOCUMENTS

| | | | |
|---|---|---|---|
| 5,561,841 A | 10/1996 | Markus | |
| 5,850,386 A | 12/1998 | Anderson et al. | |
| 6,125,072 A | 9/2000 | Wu | |
| 6,771,957 B2 | 8/2004 | Chitrapu | |
| 6,996,772 B2 | 2/2006 | Justice et al. | |
| 7,543,054 B1 | 6/2009 | Bansod et al. | |
| 7,765,313 B2 | 7/2010 | Jain et al. | |
| 8,601,585 B2 | 12/2013 | Beddoe et al. | |
| 8,724,498 B2 | 5/2014 | Choi et al. | |
| 8,738,985 B2 | 5/2014 | Deng et al. | |
| 2006/0276195 A1 | 12/2006 | Nordling | |
| 2009/0052473 A1 | 2/2009 | Choi et al. | |
| 2009/0077456 A1 | 3/2009 | Pi et al. | |
| 2009/0077457 A1 | 3/2009 | Ramesh et al. | |
| 2009/0100300 A1 | 4/2009 | Kim | |
| 2009/0196244 A1 | 8/2009 | Chun et al. | |
| 2009/0245187 A1 | 10/2009 | Nam et al. | |
| 2010/0075678 A1 | 3/2010 | Akman et al. | |
| 2010/0165847 A1 | 7/2010 | Kamuf et al. | |
| 2010/0184447 A1 | 7/2010 | Miki et al. | |
| 2010/0195743 A1 | 8/2010 | Barsoum et al. | |
| 2010/0272011 A1 | 10/2010 | Palanki et al. | |
| 2010/0290371 A1 | 11/2010 | Beale | |
| 2010/0303011 A1 | 12/2010 | Pan et al. | |
| 2010/0331030 A1 | 12/2010 | Nory et al. | |

(Continued)

OTHER PUBLICATIONS

Non-Final Office Action for U.S. Appl. No. 13/154,166 (Aug. 19, 2013).

(Continued)

*Primary Examiner* — Ricky Ngo
*Assistant Examiner* — Christine Ng
(74) *Attorney, Agent, or Firm* — Jenkins, Wilson, Taylor & Hunt, P.A.

(57) ABSTRACT

According to one aspect, the subject matter described herein includes a method for validating a long term evolution (LTE) transport data block and code blocks within the data block. The method includes steps occurring at an LTE traffic simulator configured to simulate plural user equipment (UE) devices. The steps include receiving, from an evolved nodeB under test, an LTE transport block including a plurality of code blocks. The steps also include decoding the code blocks and verifying a cyclic redundancy check (CRC) code for each of the code blocks. The steps further include while decoding the code blocks and verifying the CRC codes for the code blocks, verifying a CRC code for the transport block.

15 Claims, 7 Drawing Sheets

(56) References Cited

U.S. PATENT DOCUMENTS

| | | |
|---|---|---|
| 2011/0032925 A1 | 2/2011 | Lee et al. |
| 2011/0044196 A1 | 2/2011 | Ishii |
| 2011/0076962 A1 | 3/2011 | Chen et al. |
| 2011/0086659 A1 | 4/2011 | Yoon et al. |
| 2011/0110315 A1 | 5/2011 | Chen et al. |
| 2011/0119552 A1 | 5/2011 | Park et al. |
| 2011/0158333 A1 | 6/2011 | Nakano et al. |
| 2011/0170439 A1 | 7/2011 | Miki et al. |
| 2011/0206151 A1 | 8/2011 | McCloud et al. |
| 2011/0235586 A1 | 9/2011 | Han et al. |
| 2012/0033650 A1 | 2/2012 | Ahn et al. |
| 2012/0039246 A1 | 2/2012 | Zhang et al. |
| 2012/0042226 A1 | 2/2012 | Ramesh et al. |
| 2012/0051271 A1 | 3/2012 | Beale |
| 2012/0063384 A1 | 3/2012 | Bi et al. |
| 2012/0093249 A1 | 4/2012 | Sun et al. |
| 2012/0094651 A1 | 4/2012 | Chun et al. |
| 2012/0150521 A1 | 6/2012 | Balkwill |
| 2012/0170524 A1 | 7/2012 | Ren et al. |
| 2012/0204081 A1 | 8/2012 | Fresia et al. |
| 2013/0010724 A1 | 1/2013 | Han et al. |
| 2013/0024753 A1 | 1/2013 | Masuda et al. |
| 2013/0034062 A1 | 2/2013 | Seo et al. |
| 2013/0058240 A1 | 3/2013 | Kim et al. |
| 2013/0058294 A1 | 3/2013 | Miki et al. |
| 2013/0058306 A1 | 3/2013 | Noh et al. |
| 2013/0060735 A1 | 3/2013 | Haddy et al. |
| 2013/0070689 A1 | 3/2013 | Liu et al. |
| 2013/0070690 A1 | 3/2013 | Moon et al. |
| 2013/0088973 A1 | 4/2013 | Yang et al. |
| 2013/0115987 A1 | 5/2013 | Yoo et al. |
| 2013/0121168 A1 | 5/2013 | Luo et al. |
| 2013/0121295 A1 | 5/2013 | Saito et al. |
| 2013/0155867 A1 | 6/2013 | Asokan et al. |
| 2013/0155872 A1 | 6/2013 | Subramanian et al. |
| 2013/0155878 A1 | 6/2013 | Deng et al. |
| 2013/0184023 A1 | 7/2013 | Asokan et al. |
| 2013/0208603 A1 | 8/2013 | Choi et al. |
| 2013/0227092 A1 | 8/2013 | Maestas |
| 2013/0227233 A1 | 8/2013 | Asokan |
| 2013/0275606 A1 | 10/2013 | Iyer |

OTHER PUBLICATIONS

Non-Final Office Action for U.S. Appl. No. 13/396,577 (Aug. 8, 2013).

Radio Electronics, "LTE CA: Carrier Aggregation Tutorial", pp. 1-7 http://www.radio-electronics.com/info/cellulartelecomms/lte-long-term-evolution/4g-lte-advanced-carrier-channel-aggregation.php (Printed from the Internet Aug. 7, 2013).

ShareTechnote "Frame Structure—Downlink", pp. 1-11 http://www.sharetechnote.com/html/FrameStructure_DL.html#PCFICH (Printed from the Internet Aug. 7, 2013).

Non-Final Office Action for U.S. Appl. No. 13/336,005 (Jul. 2, 2013).

Non-Final Office Action for U.S. Appl. No. 13/431,975 (May 24, 2013).

Commonly assigned, co-pending U.S. Appl. No. 13/835,658 for "Methods, Systems, and Computer Readable Media for Utilizing Adaptive Symbol Processing in a Multiple User Equipment (Multi-UE) Simulator", (unpublished, filed Mar. 15, 2013).

3rd Generation Partnership Project, "Technical Specification Group Radio Access Network; Evolved Universal Terrestrial Radio Access (E-UTRA); Physical layer procedures (Release 11)," 3GPP TS 36.213, V11.2.0, pp. 1-173 (Feb. 2013).

3rd Generation Partnership Project, "Technical Specification Group Radio Access Network: Evolved Universal Terrestrial Radio Access (E-UTRA); Multiplexing and channel coding (Release 11)," 3GPP TS 36.212, V11.2.0, pp. 1-8 (Feb. 2013).

3rd Generation Partnership Project, "Technical Specification Group Radio Access Network; Evolved Universal Terrestrial Radio Access Network (E-UTRA); Physical Channels and Modulation (Release 11)," 3GPP TS 36.211, V11.2.0, pp. 1-109 (Feb. 2013).

3rd Generation Partnership Project, "Technical Specification Group Radio Access Network; Evolved Universal Terrestrial Radio Access (E-UTRA); Physical layer; Measurements (Release 11)," 3GPP TS 36.214, V11.1.0, pp. 1-14 (Dec. 2012).

3rd Generation Partnership Project, "Technical Specification Group Radio Access Network; Evolved Universal Terrestrial Radio Access (E-UTRA); LTE physical layer, General description (Release 11)," 3GPP TS 36.201, V11.1.0, pp. 1-13 (Dec. 2012).

3rd Generation Partnership Project, "Technical Specification Group Radio Access Network; Evolved Universal Terrestrial Radio Access (E-UTRA); Physical layer for relaying operation (Release 11)," 3GPP TS 36.215, V11.0.0, pp. 1-16 (Sep. 2012).

Xiao et al., "IMS Network Deployment Cost Optimization Based on Flow-Based Traffic Model," IEEE/IFIP Network Operations and Management Symposium—NOMS 2010, pp. 232-239 (2010).

"Network Topology," http://web.archive.org/web/20081219235147/http://en.wikipedia.org/wiki/Network_topology, pp. 1-9 (Dec. 19, 2008).

Notice of Allowance and Fee(s) Due for U.S. Appl. No. 13/408,787 (Jul. 18, 2014).

Non-Final Office Action for U.S. Appl. No. 13/447,160 (Jul. 10, 2014).

Notice of Allowance and Fee(s) Due for U.S. Appl. No. 13/326,264 (Jun. 9, 2014).

Notice of Allowance and Fee(s) Due for U.S. Appl. No. 13/154,166 (Jun. 2, 2014).

Advisory Action for U.S. Appl. No. 13/447,160 (May 29, 2014).

Applicant-Initiated Interview Summary for U.S. Appl. No. 13/447,160 (May 23, 2014).

Applicant-Initiated Interview Summary for U.S. Appl. No. 13/154,166 (Apr. 28, 2014).

Non-Final Office Action for U.S. Appl. No. 13/429,384 (Apr. 9, 2014).

Final Office Action for U.S. Appl. No. 13/447,160 (Mar. 18, 2014).

Final Office Action for U.S. Appl. No. 13/154,166 (Mar. 3, 2014).

Final Office Action for U.S. Appl. No. 13/336,005 (Feb. 26, 2014).

Interview Summary for U.S. Appl. No. 13/447,160 (Feb. 25, 2014).

Final Office Action for U.S. Appl. No. 13/326,264 (Feb. 20, 2014).

Non-Final Office Action for U.S. Appl. No. 13/408,787 (Feb. 3, 2014).

Notification of Transmittal of the International Search Report and the Written Opinion of the International Searching Authority, or the Declaration for International Application No. PCT/US2012/070877 (Mar. 28, 2013).

3rd Generation Partnership Project, "Technical Specification Group Radio Access Network; Evolved Universal Terrestrial Radio Access (E-UTRA); Physical layer for relaying operation (Release 11)," 3GPP TS 36.216, V11.0.0, pp. 1-16 (Sep. 2012).

Ikuno et al., "System level simulation of LTE networks," 2010 IEEE 71st Vehicular Technology Conference: VTC2010-Spring, (May 16-19, 2010).

Abbes et al., "Protocol Analysis in Intrusion Detection Using Decision Tree," IEEE, Proceedings of the International Conference on Information Technology: Coding and Computing (ITCC'04), pp. 1-5 (2004).

Sleator et al., "Self-Adjusting Binary Search Trees," Journal of the Association for Computing Machinery. vol. 32, No. 3, pp. 652-686 (Jul. 1985).

Notice of Allowance and Fee(s) Due for U.S. Appl. No. 13/431,975 (Jan. 22, 2014).

Notice of Allowance and Fee(s) Due for U.S. Appl. No. 13/396,577 (Dec. 18, 2013).

Non-Final Office Action for U.S. Appl. No. 13/447,160 (Nov. 8, 2013).

Non-Final Office Action for U.S. Appl. No. 13/431,975 (Oct. 10, 2013).

Non-Final Office Action for U.S. Appl. No. 13/326,264 (Oct. 10, 2013).

Commonly assigned, co-pending U.S. Appl. No. 13/447,160 for "Methods, Systems, and Computer Readable Media for Heuristics-Based Adaptive Protocol Parsing," (unpublished, filed Apr. 13, 2012).

Commonly assigned, co-pending U.S. Appl. No. 13/431,975 for "Methods, Systems, and Computer Readable Media for Dynamically (56) References Cited

OTHER PUBLICATIONS

Controlling a Turbo Decoding Process in a Long Term Evolution (LTE) Multi-User Equipment (UE) Traffic Simulator," (unpublished, filed Mar. 28, 2012).

Commonly assigned, co-pending U.S. Appl. No. 13/429,384 for "Searchable Architecture for Multiple User Equipment (Multi-UE) Simulation," (unpublished, filed Mar. 25, 2012).

Commonly assigned, co-pending U.S. Appl. No. 13/408,787 for "Methods, Systems, and Computer Readable Media for Integrated Sub-Block Interleaving and Rate Matching," (unpublished, filed Feb. 29, 2012).

Commonly assigned, co-pending U.S. Appl. No. 13/396,577 for "Methods, Systems, and Computer Readable Media for Performing Long Term Evolution (LTE) Channel Delineation," (unpublished, filed Feb. 14, 2012).

Commonly assigned, co-pending U.S. Appl. No. 13/352,058 for "Methods, Systems, and Computer Readable Media for Long Term Evolution (LTE) Uplink Data Processing," (unpublished, filed. Jan. 17, 2012).

Commonly assigned, co-pending U.S. Appl. No. 13/336,005 for "Methods, Systems, and Computer Readable Media for Reducing the Impact of False Downlink Control Information (DCI) Detection in Long Term Evolution (LTE) Physical Downlink Control Channel (PDCCH) Date," (unpublished, filed Dec. 23.

Commonly assigned, co-pending U.S. Appl. No. 13/326,264 for "Methods, Systems, and Computer Readable Media for Improved Long Term Evolution (LTE) Hybrid Automatic Repeat Request (HARQ) Processing," (unpublished, filed Dec. 14, 2011).

"3rd Generation Partnership Project; Technical Specification Group Radio Access Network; Evolved Universal Terrestrial Radio Access (E-UTRA) and Evolved Universal Terrestrial Radio Access Network (E-UTRAN); Overall description; Stage 2 (Release 9)," 3GPP TS 36.300 v9.9.0 (Dec. 2011).

"3rd Generation Partnership Project; Universal Mobile Telecommunications Systems (UMTS); Evolved Universal Terrestrial Radio Access (E-UTRA); Physical layer for relaying operation (Release 10)," 3GPP TS 36.216, v10.3.1 (Sep. 2011).

"3rd Generation Partnership Project; Technical Specification Group Radio Access Network; Evolved Universal Terrestrial Radio Access (E-UTRA); Physical layer procedures (Release 10)," 3GPP TS 36.213, V10.3.0 (Sep. 2011).

"3rd Generation Partnership Project; Technical Specification Group Radio Access Network; Evolved Universal Terrestrial Radio Access (E-UTRA); Multiplexing and channel coding (Release 10)," 3GPP TS 36.212, V10.3.0 (Sep. 2011).

"3rd Generation Partnership Project; Technical Specification Group Radio Access Network; Evolved Universal Terrestrial Radio Access (E-UTRA); Physical Channels and Modulation (Release 10)," 3GPP TS 36.211, V10.3.0 (Sep. 2011).

"LTE; Evolved Universal Terrestrial Radio Access (E-UTRA); Physical layer; Measurements (3GPP TS 36.214 version 10.1.0 Release 10)," ETSI TS 136 214, V10.1.0 (Apr. 2011).

Third Generation Partnership Project, "Technical Specification Group Radio Access Network; Evolved Universal Terrestrial Radio Access (E-UTRA); LTE Physical Layer; General Description," 3GPP TS 36.201 v10.0.0, Release 10 (Dec. 2010).

"IxCatapult Chassis," http://www.ixiacom.com/products/display?skey=ch_ixcatapult, pp. 1-2 (Downloaded from the Internet Apr. 14, 2010).

"Wireless Network Testing," Ixia, 915-2623-01 Rev A, pp. 1-18 (Jan. 2010).

"Wireless Network Testing," Ixia, 915-2622-01 Rev A, pp. 1-16 (Jan. 2010).

"3rd Generation Partnership Project; Technical Specification Group Radio Access Network; Requirements for Evolved UTRA (E-UTRA) and Evolved UTRAN (E-UTRAN) (Release 9)," 3GPP TR 25.913, v9.0.0 (Dec. 2009).

"PDCCH Blind Decoding," PDCCH Decoding Example, http://www.steepestascent.com, pp. 1-6 (Copyright 2009-2011, dowloaded from the Internet Dec. 4, 2011).

METHODS, TRAFFIC SIMULATORS, AND COMPUTER READABLE MEDIA FOR VALIDATING LONG TERM EVOLUTION (LTE) CODE BLOCKS AND TRANSPORT BLOCKS

TECHNICAL FIELD

The subject matter described herein relates to validating long term evolution (LTE) code blocks and transport blocks. More specifically, the subject matter relates to methods, traffic simulators, and computer readable media for validating LTE code blocks and transport blocks.

BACKGROUND

As cellular communication technology evolves, providers are able to more effectively utilize their allocated spectrum. Enhanced protocols such as those specified by the 3rd generation partnership project's (3GPP) long term evolution (LTE) standards are enabling providers to increase the speed and capacity of their wireless networks. These enhanced protocols, however, are significantly more complex than their predecessors and require the design, integration, and support of new hardware, such as mobile base stations, within a provider's network. The successful implementation of such hardware often requires multiple iterations of testing and refinements in order to meet the specified performance requirements. Testing such hardware, however, is also becoming an increasingly complex task. As the number of user equipment (UE) nodes supported by a base station and the individual resource utilization of such UEs increases, testing hardware must be optimized to effectively simulate such demands.

Accordingly, a need exists for methods, traffic simulators, and computer readable media for validating LTE code blocks and transport blocks.

SUMMARY

According to one aspect, the subject matter described herein includes a method for validating an LTE transport data block and code blocks within the data block. The method includes steps occurring at an LTE traffic simulator configured to simulate plural UE devices. The steps include receiving, from an evolved nodeB under test, an LTE transport block including a plurality of code blocks. The steps also include decoding the code blocks and verifying a cyclic redundancy check (CRC) code for each of the code blocks. The steps further include while decoding the code blocks and verifying the CRC codes for the code blocks, verifying a CRC code for the transport block.

According to another aspect, the subject matter described herein includes an LTE traffic simulator configured to simulate plural UE devices and validate an LTE transport data block and code blocks within the data block. The traffic simulator includes a communication interface configured to receive, from an evolved nodeB under test, an LTE transport block including a plurality of code blocks. The traffic simulator also includes a channel decoder. The channel decoder is configured to decode the code blocks and verify a CRC code for each of the code blocks. The channel decoder is also configured to, while decoding the code blocks and verifying the CRC codes for the code blocks, verify a CRC code for the transport block.

As used herein, the term "node" refers to a physical computing platform including one or more processors and memory.

As used herein, the term "module" refers to software in combination with hardware (such as a processor) and/or firmware for implementing features described herein.

The subject matter described herein can be implemented in software in combination with hardware and/or firmware. For example, the subject matter described herein may be implemented in software executed by one or more processors. In one exemplary implementation, the subject matter described herein may be implemented using a non-transitory computer readable medium having stored thereon computer executable instructions that when executed by the processor of a computer control the computer to perform steps. Exemplary computer readable media suitable for implementing the subject matter described herein include non-transitory computer readable media, such as disk memory devices, chip memory devices, programmable logic devices, and application specific integrated circuits. In addition, a computer readable medium that implements the subject matter described herein may be located on a single device or computing platform or may be distributed across multiple devices or computing platforms.

BRIEF DESCRIPTION OF THE DRAWINGS

The subject matter described herein will now be explained with reference to the accompanying drawings of which.

DETAILED DESCRIPTION

Figure 1:
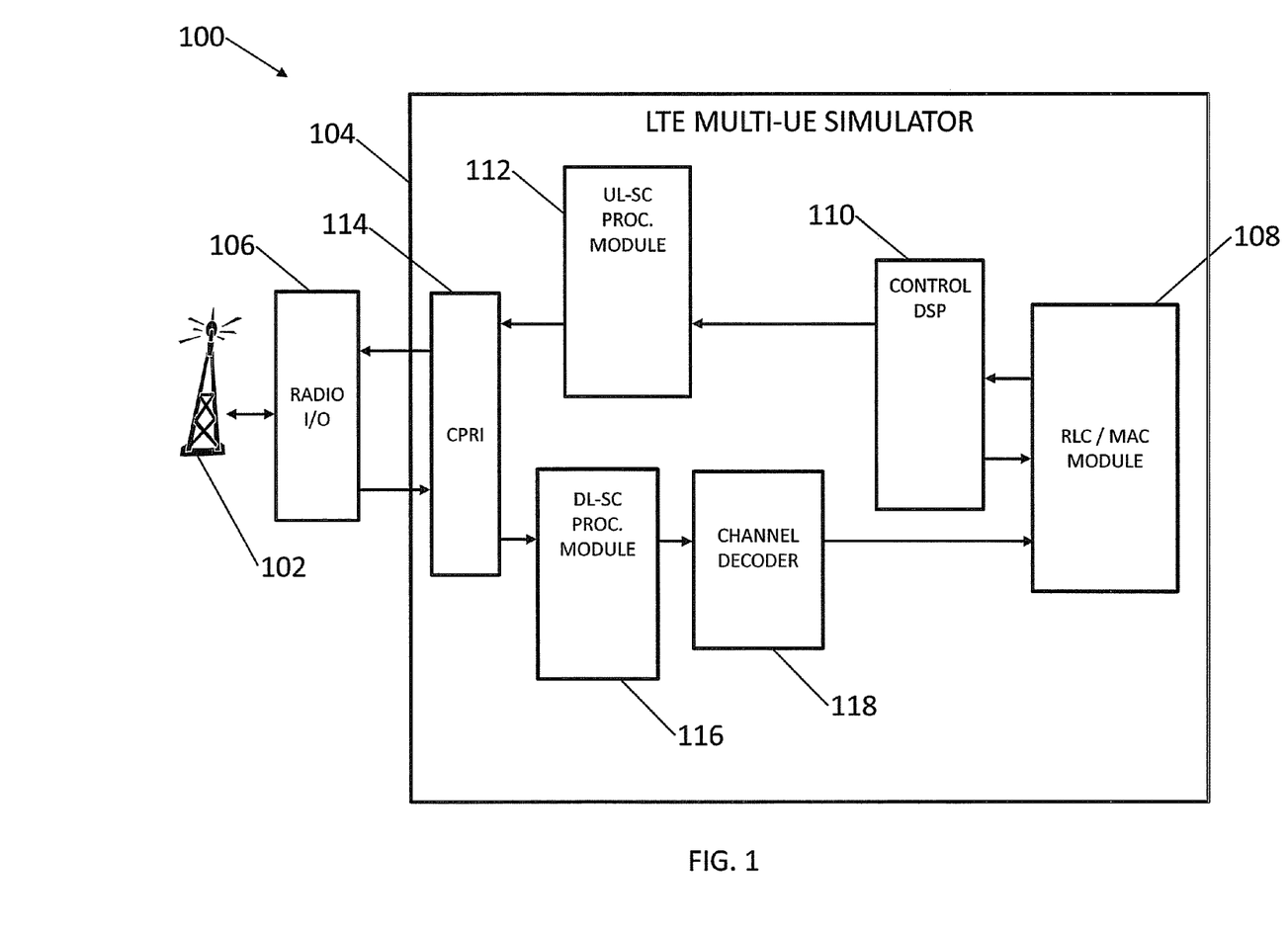
FIG. 1 is a network diagram of an exemplary system for validating an LTE transport data block and code blocks within the data block in accordance with embodiments of the subject matter described herein.

Methods, traffic simulators, and computer readable media for validating LTE code blocks and transport blocks are provided. FIG. 1 is a network diagram of an exemplary system for validating an LTE transport data block and code blocks within the data block in accordance with embodiments of the subject matter described herein. Referring to FIG. 1, network environment 100 may include network node 102 and LTE multi-UE simulator 104. Network node 102 may be a base station node for a cellular network, for example, network node 102 may be an evolved nodeB (eNodeB). LTE multi-UE simulator 104 may be a computing platform for simulating the functionality of plural UE devices to test the functionality of network node 102. LTE multi-UE simulator 104 may be operatively associated with or include radio input/output (I/O) module 106 for communicating with network node 102 over a wireless or radio interface.

LTE multi-UE simulator 104 may be configured to generate network traffic to simulate plural LTE UE devices. LTE multi-UE simulator 104 may include radio link control (RLC)/medium access control (MAC) module 108 for performing higher layer processing. Radio I/O module 106 interfaces with common public radio interface (CPRI) module 114. CPRI module 114 receives data in the downlink direction for further processing and sends data in the uplink direction to radio I/O module 106. Downlink signal chain processing (DL-SC) module 116 receives downlink data from CPRI module 114. DL-SC processing module 116 forwards the received downlink data to control digital signal processor (DSP) 110. Control DSP 110 controls the overall operation of LTE multi-UE simulator 104 for simulating the LTE physical layer. Control DSP 110 processes control information and directs data intended for upper layers in RLC/MAC module 108. Control DSP 110 processes the downlink control information and provides the DL-SC processing module 116 with the information required to process the downlink data. DL-SC processing module 116 sends the downlink data to channel decoder 118. Channel decoder 118 sends the decoded data to RLC/MAC module 108. On the uplink side, uplink signal chain (UL-SC) processing module 112 formulates uplink transport blocks, sends the blocks to CPRI module 114, which sends the transport blocks to radio I/O module 106 for transmission to network node 102.

In accordance with embodiments of the subject matter described herein, channel decoder 118 may validate an LTE transport data block and code blocks within the data block.

Figure 2:
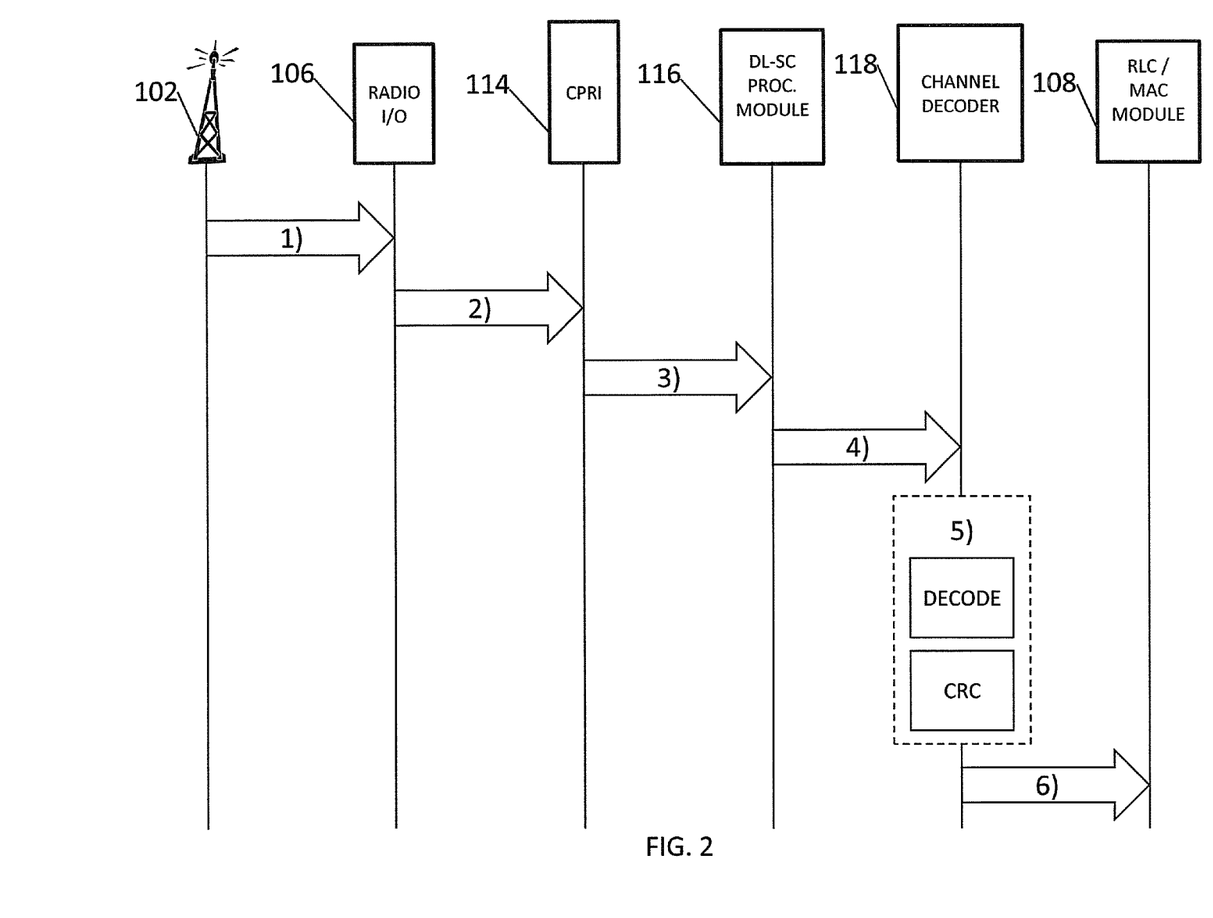
FIG. 2 is a flow diagram illustrating an exemplary sequence for validating an LTE transport data block and code blocks within the data block in accordance with embodiments of the subject matter described herein.

FIG. 2 is a flow diagram illustrating an exemplary sequence for validating an LTE transport data block and code blocks within the data block in accordance with embodiments of the subject matter described herein. Referring to FIG. 2, at step 1, network node 102 may transmit a transport data block to radio I/O module 106. For example, network node 102 may be an eNodeB being tested by LTE multi-UE simulator 104 and the transport data block may be a physical downlink shared channel (PDSCH) transport code block. Radio I/O module 106 may receive the transport data block from network node 102 and, at step 2, radio I/O module 106 may communicate the transport data block to LTE multi-UE simulator 104 via CPRI module 114. At step 3, CPRI module 114 may communicate the transport data block to DL-SC processing module 116. The transport data block may be encoded and/or may require CRC calculation/verification. For example, the transport data block may have been encoded in accordance with a Viterbi algorithm or schema and may contain one or more CRC codes. At step 4, DL-SC processing module 116 may communicate the transport data block to channel decoder 118 for decoding and/or CRC calculation/verification.

In accordance with embodiments of the subject matter described herein, channel decoder 118 may be configured to perform decoding and CRC calculation/verification contemporaneously. In some embodiments, channel decoder 118 may be configured to perform decoding and CRC calculation/verification simultaneously. Performing decoding and CRC calculation/verification contemporaneously reduces the overall time required for processing the transport data block. For example, if the transport data block were decoded and then a CRC calculation/verification was performed for the transport data block, the data within the transport data block would be parsed two separate times. A first pass of the data would be made during the decoding phase and then an additional pass of the data would be performed in calculating/verifying the CRC code. By decoding the transport data block and calculating/verifying the CRC code contemporaneously, channel decoder 118 need only parse the data contained in the transport data block once, thereby reducing the time required to process the transport data block.

At step 5, channel decoder 118 may contemporaneously decode the transport data block and perform CRC calculation/verification for the transport data block. For example, channel decoder 118 may include a convolutional encoder/decoder and one or more linear feedback shift registers. Channel decoder 118 may parse the data contained in the transport data block, running each bit through both the convolutional encoder/decoder and one or more of the linear feedback shift registers. As the data contained within the transport data block is parsed, and run through each of the convolutional encoder/decoder and the one or more linear feedback shift registers, the convolutional encoder/decoder may decode the data and the linear feedback shift register(s) may adjust their state to reflect each additional bit processed. After the final bit in the transport data block has been parsed and passed through each of the convolutional encoded/decoder and the linear feedback shift register(s), the data block will have been decoded and the linear feedback shift register(s) will contain one or more CRC values which may be verified. Thus, channel decoder 118 will have decoded the transport data block and contemporaneously performed CRC calculation/verification for the transport data block, having only been required to parse the transport data block a single time. Having decoded the transport data block and contemporaneously performed CRC calculation/verification for the transport data block, at step 6, channel decoder 118 may communicate the data contained within the transport data block to RLC/MAC module 108 for further processing.

Figure 3:
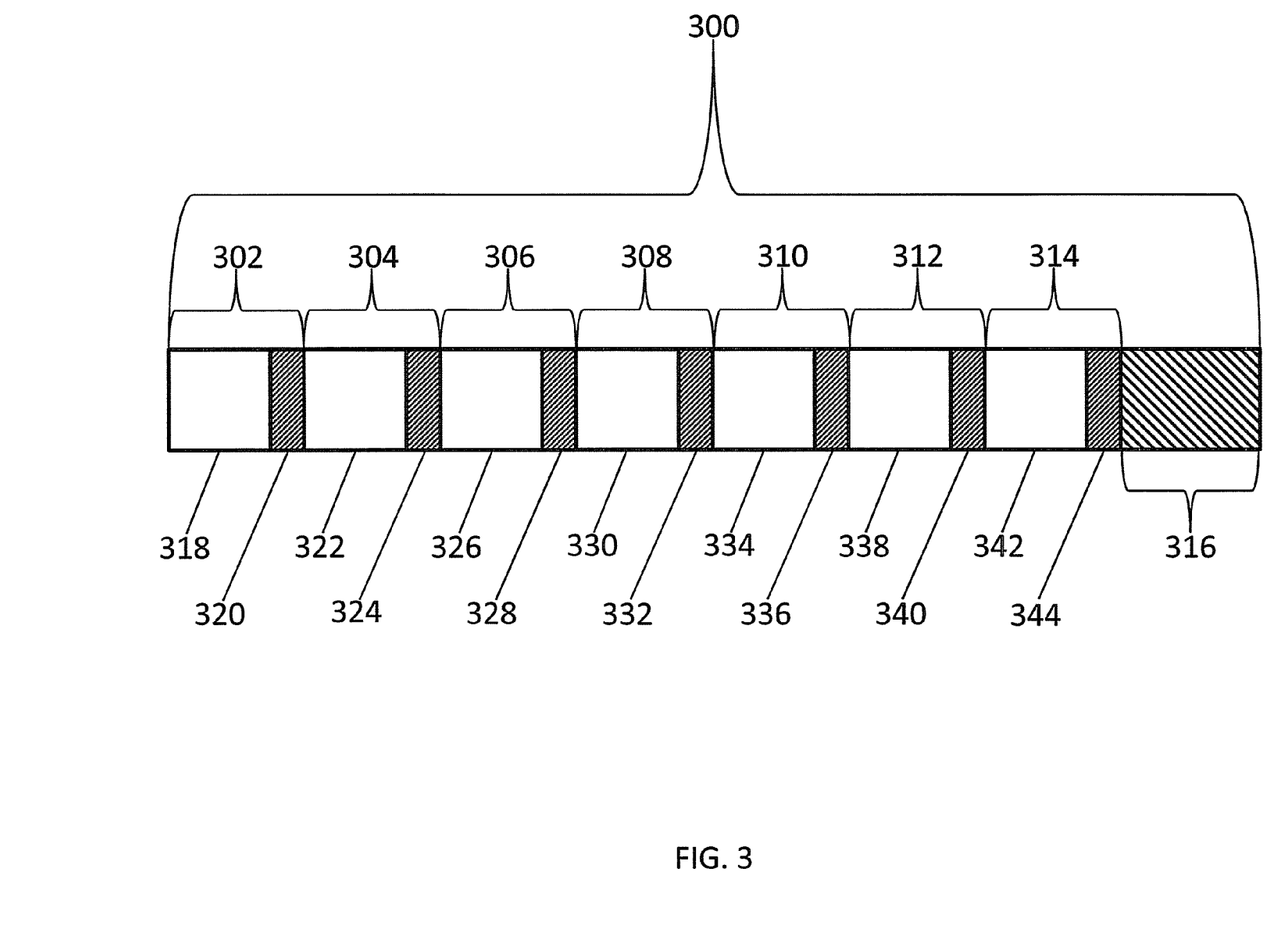
FIG. 3 is a block diagram illustrating an exemplary transport data block for validating an LTE transport data block and code blocks within the data block in accordance with embodiments of the subject matter described herein.

FIG. 3 is a block diagram illustrating an exemplary transport data block for validating an LTE transport data block and code blocks within the data block in accordance with embodiments of the subject matter described herein. Referring to FIG. 3, transport data block 300 may include one or more code data blocks. For example, transport data block 300 includes code data blocks 302, 304, 306, 308, 310, 312, and 314. Transport data block 300 may also include a CRC code portion containing a CRC code value that corresponds to the data contained within transport data block 300. For example, transport data block 300 includes CRC code portion 316. Each of the code data blocks contained within transport data block 300 may include a data portion and a CRC code portion corresponding to the data contained within the data portion. For example, code data block 302 may include data portion 318 and CRC code portion 320. Similarly, code data block 304 may include data portion 322 and CRC code portion 324, code data block 306 may include data portion 326 and CRC code portion 328, code data block 308 may include data portion 330 and CRC code portion 332, code data block 310 may include data portion 334 and CRC code portion 336, code data block 312 may include data portion 338 and CRC code portion 340, and code data block 314 may include data portion 342 and CRC code portion 344.

Figure 4A:
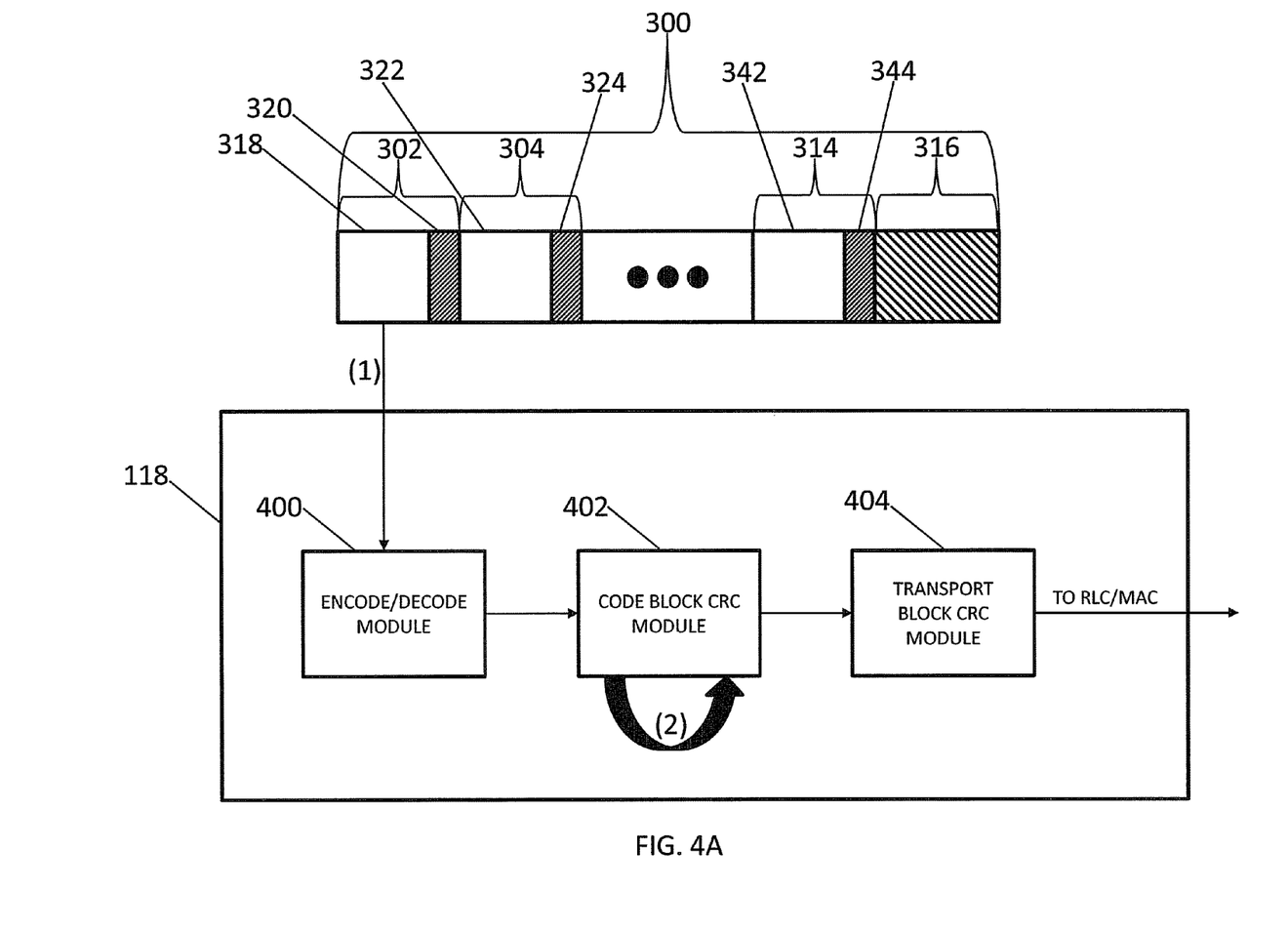
FIGS. 4A, 4B, and 4C are respectively first, second, and third portions of a flow diagram illustrating an exemplary channel decoder for validating an LTE transport data block and code blocks within the data block in accordance with embodiments of the subject matter described herein.
Figure 4B:
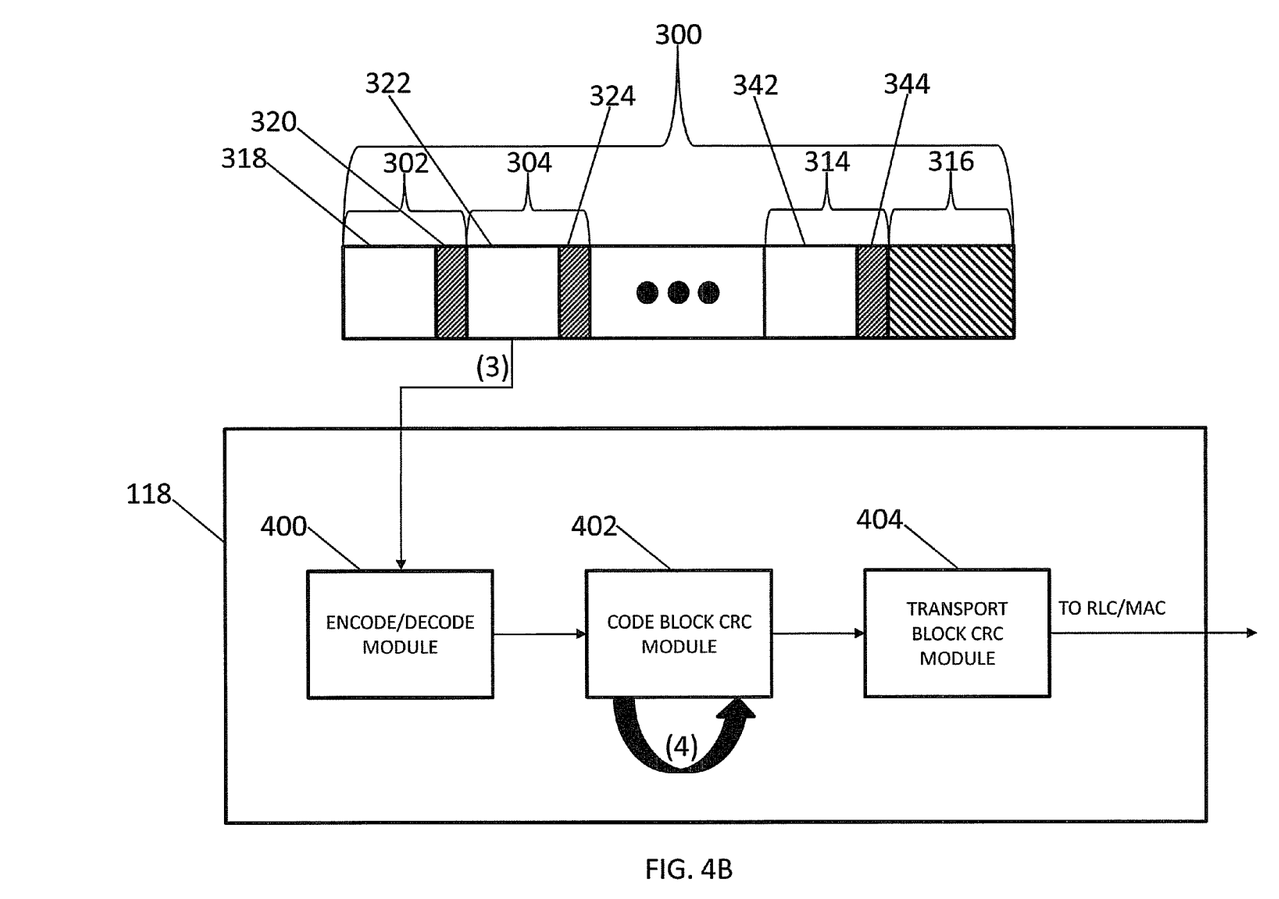
Figure 4C:
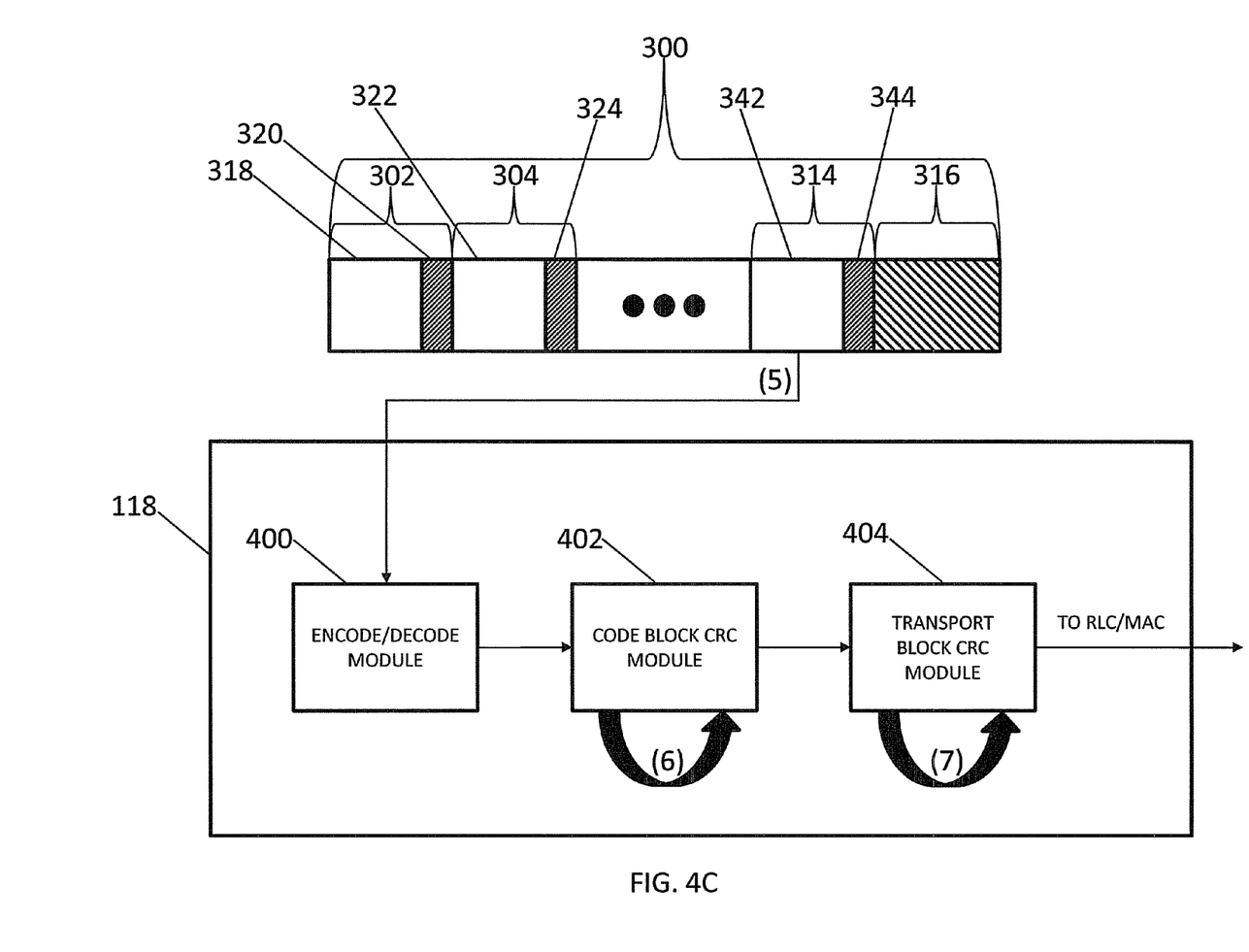

FIGS. 4A, 4B, and 4C are respectively first, second, and third portions of a flow diagram illustrating an exemplary channel decoder for validating an LTE transport data block and code blocks within the data block in accordance with embodiments of the subject matter described herein. Referring to FIG. 4A, channel decoder 118 may include encode/decode module 400 for decoding transport data block 300. Encode/decode module 400 may be, for example, a convolutional encoder/decoder. Channel decoder 118 may also include code block CRC module 402 for calculating/verifying CRC codes for each of the code data blocks contained within transport data block 300, such as, code data blocks 302, 304, 306, 308, 310, 312, and 314. Code block CRC module 402 may be, for example, a linear feedback shift register. Channel decoder 118 may further include transport block CRC module 404 for calculating/verifying a CRC code for transport data block 300. Transport block CRC module 404 may be, for example, a linear feedback shift register.

Figure 5:
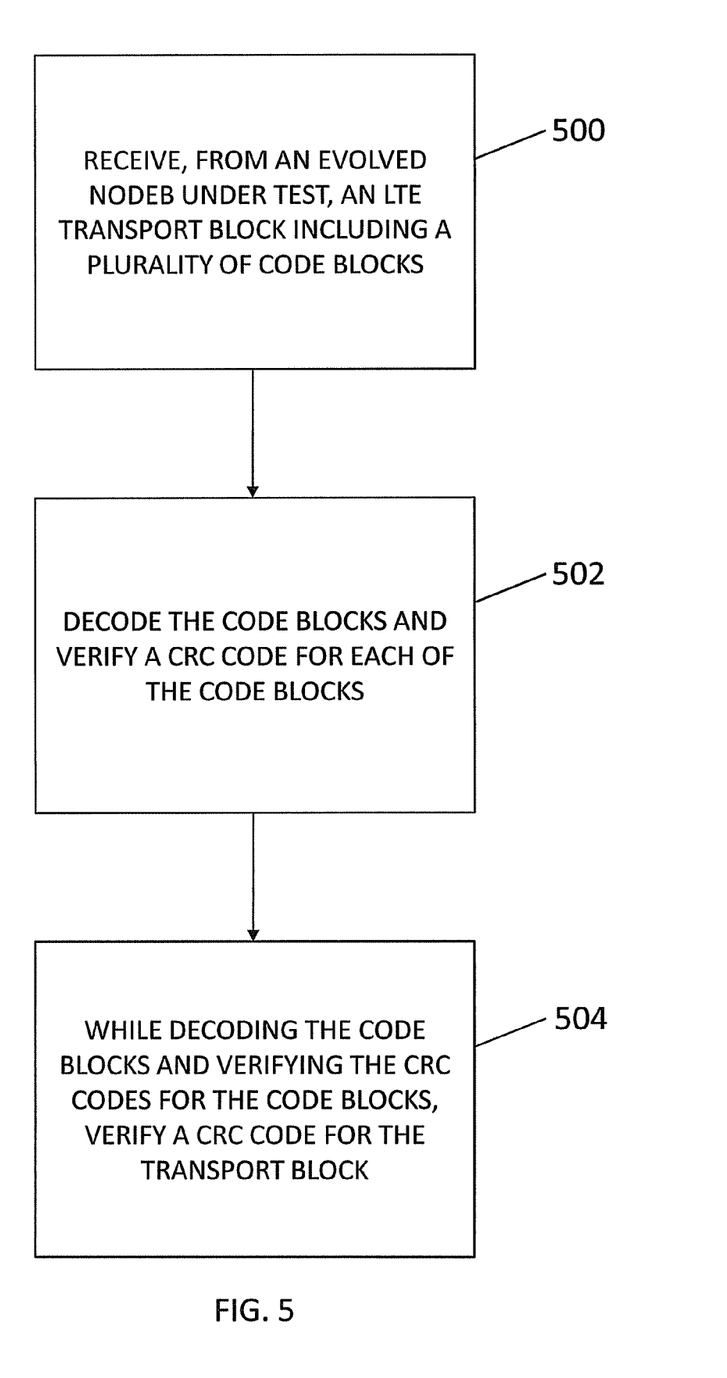
FIG. 5 is a flow chart illustrating an exemplary process for validating an LTE transport data block and code blocks within the data block in accordance with embodiments of the subject matter described herein.

At step 1, channel decoder 118 may begin to process transport data block 300 with code data block 302. Channel decoder 118 may parse data portion 318 of code data block 302, passing each bit through encode/decode module 400, code block CRC module 402, and transport block CRC module 404. After the last bit of data portion 318 of code data block 302 has been processed, code block CRC module 402 may compare its state value to a CRC value stored in CRC code portion 320 of code data block 302. At step 2, code block CRC module 402 may reset its state value to prepare to process a new code data block. Referring to FIG. 4B, at step 3, channel decoder 118 may continue to process transport data block 300 by beginning to process code data block 304. Channel decoder 118 may parse data portion 322 of code data block 304, passing each bit through encode/decode module 400, code block CRC module 402, and transport block CRC module 404. After the last bit of data portion 322 of code data block 304 has been processed, code block CRC module 402 may compare its state value to a CRC value stored in CRC code portion 324 of code data block 304. At step 4, code block CRC module 402 may reset its state value to prepare to process a new code data block. This process may be repeated for each code data block within transport data block 300. Referring to FIG. 4C, at step 5, channel decoder 118 may continue to process transport data block 300 by beginning to process code data block 314, the final code data block of transport data block 300. Channel decoder 118 may parse data portion 342 of code data block 314, passing each bit through encode/decode module 400, code block CRC module 402, and transport block CRC module 404. After the last bit of data portion 342 of code data block 314 has been processed, code block CRC module 402 may compare its state value to a CRC value stored in CRC code portion 344 of code data block 314. At step 6, code block CRC module 402 may reset its state value to prepare to process a new code block, namely the first code block of the next transport data block. Having processed the final code data block of transport data block 300, transport block CRC module 404 may compare its state value to a CRC value stored in CRC code portion 316 of transport data block 300. At step 7, transport block CRC module 404 may reset its state value to prepare to process the next transport data block FIG. 5 is a flow chart illustrating an exemplary process for validating an LTE transport data block and code blocks within the data block in accordance with embodiments of the subject matter described herein. Referring to FIG. 5, in step 500, an LTE transport block including a plurality of code blocks is received from an evolved nodeB. For example, transport data block 300 may be received from network node 102. In step 502, the code blocks are decoded and a CRC code for each of the code blocks is verified. For example, code data blocks 302, 304, 306, 308, 310, 312, and 314 may be decoded and CRC codes stored in CRC portions 320, 324, 328, 332, 336, 340, and 344 may be verified. In step 504, while decoding the code blocks and verifying the CRC codes for the code blocks, a CRC code for the transport block is verified. For example, a CRC code for transport data block 300 stored in CRC portion 316 may be verified.

It will be understood that various details of the subject matter described herein may be changed without departing from the scope of the subject matter described herein. Furthermore, the foregoing description is for the purpose of illustration only, and not for the purpose of limitation, as the subject matter described herein is defined by the claims as set forth hereinafter.

What is claimed is:

1. A method for validating a long term evolution (LTE) transport data block and code blocks within the data block, the method comprising:
at an LTE traffic simulator configured to simulate plural user equipment (UE) devices:
receiving, from an evolved nodeB under test, an LTE transport block including a plurality of code blocks;
decoding the code blocks and verifying a cyclic redundancy check (CRC) code for each of the code blocks; and
while decoding the code blocks and verifying the CRC codes for the code blocks, verifying a CRC code for the transport block.

2. The method of claim 1 wherein decoding the code blocks comprises turbo decoding the code blocks.

3. The method of claim 1 wherein verifying the CRC codes for the code blocks includes calculating a CRC code from the data in each code block.

4. The method of claim 3 wherein verifying the CRC code for the transport data block comprises maintaining a running CRC code for the transport block as each code block is decoded and comparing the CRC code to a CRC code received in each code block.

5. The method of claim 1 wherein the transport block comprises a physical downlink shared channel (PDSCH) transport block.

6. The method of claim 1 wherein the transport block includes code blocks for plural UEs that are active during a subframe.

7. The method of claim 6 wherein verifying the transport block CRC code includes calculating a transport block CRC code across all code blocks within the transport block.

8. A long term evolution (LTE) traffic simulator configured to simulate plural user equipment (UE) devices and validate an LTE transport data block and code blocks within the data block, the traffic simulator comprising:
a communication interface configured to receive, from an evolved nodeB under test, an LTE transport block including a plurality of code blocks; and
a channel decoder configured to:
decode the code blocks and verify a cyclic redundancy check (CRC) code for each of the code blocks; and
while decoding the code blocks and verifying the CRC codes for the code blocks, verify a CRC code for the transport block.

9. The traffic simulator of claim 8 wherein the channel decoder is configured to turbo decode the code blocks.

10. The traffic simulator of claim 8 wherein the channel decoder is configured to verify the CRC codes for the code blocks by calculating a CRC code from the data in each code block.

11. The traffic simulator of claim 10 wherein the channel decoder is configured to verify the CRC code for the transport data block by maintaining a running CRC code for the transport block as each code block is decoded and comparing the CRC code to a CRC code received in each code block.

12. The traffic simulator of claim 8 wherein the transport block comprises a physical downlink shared channel (PDSCH) transport block.

13. The traffic simulator of claim 8 wherein the transport block includes code blocks for plural UEs that are active during a subframe.

14. The traffic simulator of claim 13 wherein the channel decoder is configured to verify the transport block CRC code by calculating a transport block CRC code across all code blocks within the transport block.

15. A non-transitory computer readable medium comprising computer executable instructions that when executed by a processor of a computer control the computer to perform steps comprising:
- at an LTE traffic simulator configured to simulate plural user equipment (UE) devices:
  - receiving, from an evolved nodeB under test, an LTE transport block including a plurality of code blocks;
  - decoding the code blocks and verifying a cyclic redundancy check (CRC) code for each of the code blocks; and
  - while decoding the code blocks and verifying the CRC codes for the code blocks, verifying a CRC code for the transport block.

* * * * *